Figure 1:
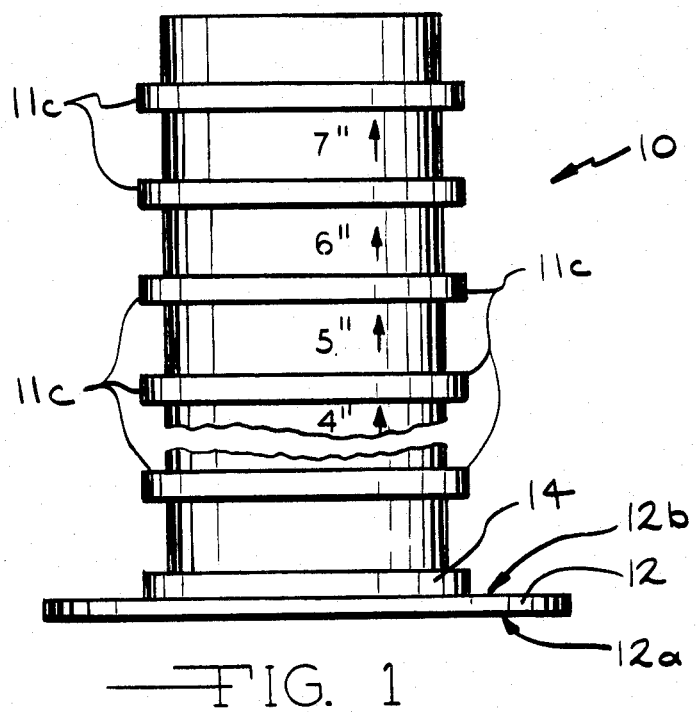

United States Patent [19]

Cornwall

[11] Patent Number: 4,623,170
[45] Date of Patent: Nov. 18, 1986

[54] COUPLING

[76] Inventor: Kenneth R. Cornwall, 717 Miami Cir., Atlanta, Ga. 30324

[21] Appl. No.: 500,538

[22] Filed: Jun. 2, 1983

[51] Int. Cl.$^4$ ............................................. F16L 35/00
[52] U.S. Cl. ........................................ 285/4; 285/64; 285/93; 285/192; 285/383; 285/423; 285/901; 285/915; 52/221; 52/699; 52/701; 264/31; 264/333; 249/177
[58] Field of Search .................. 285/3, 56, 57, 58, 59, 285/60, 64, 93, 158, 189, 192, 383, 423, DIG. 2, DIG. 16, 4, 901, 915; 264/31, 333; 52/220, 221, 699, 701, 20; 249/52, 177; 404/26

[56] References Cited

U.S. PATENT DOCUMENTS

| | | | |
|---|---|---|---|
| 1,044,347 | 11/1912 | Carlson | 285/4 |
| 1,185,846 | 6/1916 | Simpson | 285/4 X |
| 2,449,265 | 9/1948 | Williams | 285/93 X |
| 2,837,750 | 6/1958 | Robinson | 285/56 X |
| 3,265,349 | 8/1966 | Hamrick | 249/177 |
| 3,761,601 | 9/1973 | Kaesser | 285/158 X |
| 3,933,336 | 1/1976 | Tolf | 249/177 |
| 4,019,760 | 4/1977 | Streit | 285/158 |
| 4,086,736 | 5/1978 | Landrigan | 285/192 X |
| 4,238,131 | 12/1980 | Cleveland | 285/DIG. 2 |
| 4,261,598 | 4/1981 | Cornwall | 285/56 |
| 4,313,286 | 2/1982 | Harbeke | 285/64 X |
| 4,453,354 | 6/1984 | Harbeke | 285/64 X |
| 4,453,749 | 6/1984 | McKinnon | 285/4 |
| 4,488,388 | 12/1984 | Schmidt | 52/221 |

FOREIGN PATENT DOCUMENTS

| | | | |
|---|---|---|---|
| 1063718 | 3/1967 | Canada | 52/699 |
| 438203 | 11/1935 | United Kingdom | 52/221 |

Primary Examiner—Dave W. Arola
Attorney, Agent, or Firm—Ian C. McLeod

[57] ABSTRACT

An improved coupling (10) to be embedded in concrete (101) is described. The coupling includes multiple concentric rings (11c) on an outside wall (11a) of a tube (11) which aid in preventing leakage along the outside wall and which help in providing fire retardancy. The coupling includes a step form (14) having a regular diameter which aids in positioning the coupling using a template (105).

14 Claims, 3 Drawing Figures

COUPLING

BACKGROUND OF THE INVENTION (1.) Field of the Invention

The present invention relates to an improved coupling (10) adapted to be embedded in concrete (101). In particular, the present invention relates to a coupling having regularly spaced concentric rings (11c) on the outside (11b) of the coupling which provide a water tight seal with the concrete and which provide a means for adjusting the height of the coupling prior to installation by cutting to conform with the concrete pour upper surface (101a or 101b) to provide a flush fit.

(2) Prior Art

The prior art in my U.S. Pat. No. 4,261,598 describes an improved coupling. This coupling works very well but allows water to seep between the interface of the outside wall 13 of the tube 11 and the concrete 300. Further each pour of cement 300 requires a different height extension 100 with or without water closet flange 400. With my earlier coupling, solvent welding of the tube 11 pipe to the coupling was necessary for extension which required additional effort and resulted in a joint which might leak. Finally, my earlier coupling provided no protection from melting in case of fire.

OBJECTS

It is therefore an object of the present invention to provide an improved coupling (10) which reduces the possibility of leakage between the concrete and coupling interface. Further it is an object of the present invention to provide a coupling (10) which reduces melting due to fire. Further still it is an object of the present invention to provide a coupling (10) which is readily adjustable to different heights by cutting for different cement pour heights (101a or 101b). These and other objects will become increasingly apparent by reference to the following description and to the drawing.

IN THE DRAWING

FIG. 1 is a front view of a coupling (10) showing concentric rings (11c) which are at a predetermined height from the base (12a) of a circular flange (12).

Figure 2:
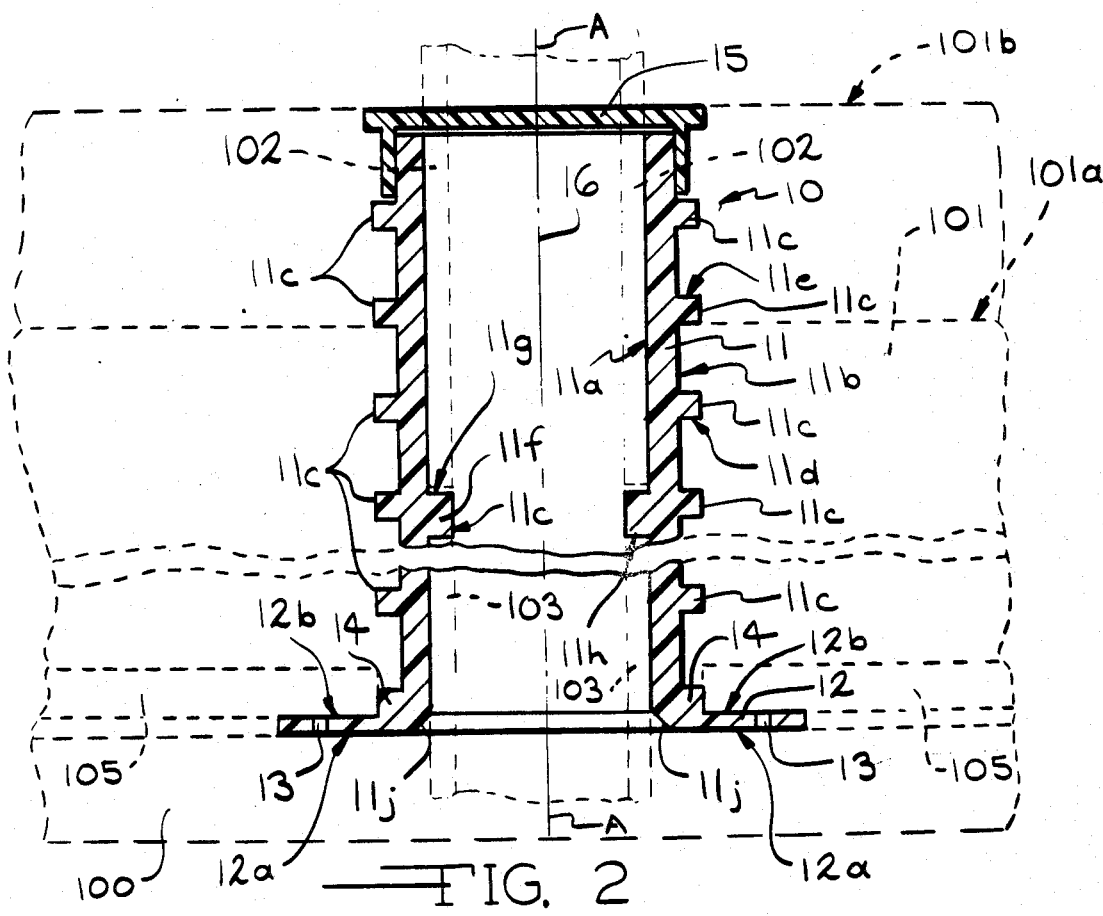
Figure 3:
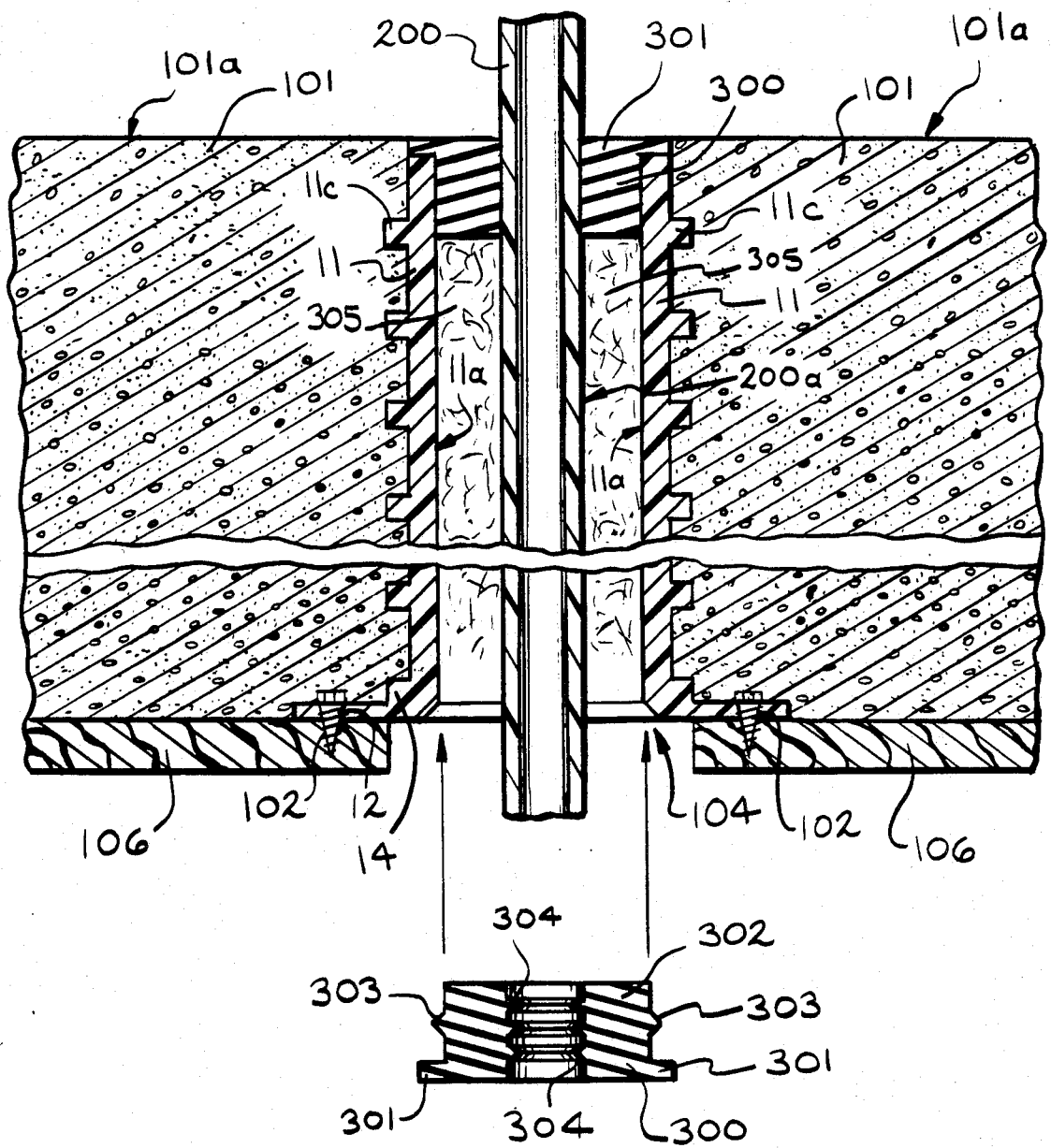

FIG. 2 is a front cross-sectional view of the coupling (10) of FIG. 1 and including in addition a removable cap (15) used during pouring of the cement and showing plastic pipe (102) in dotted lines which is installed after pouring FIG. 3 is a front cross-sectional view of the coupling (10) of FIG. 2 wherein a small diameter pipe (200) is held in place by retainers (300) and wherein a fire retardant packing (305) is provided inside the coupling.

GENERAL DESCRIPTION

The present invention relates to a coupling (10) having spaced apart parallel cylindrical inside and outside walls which coupling is adapted to be embedded in a concrete floor (101) for supporting pipe (102, 200) and to be at least temporarily supported by a form (100) for pouring the concrete floor which comprises:

(a) a tube 11 having an inside cylindrical wall (11a) defining a cylindrical longitudinal axis (A—A), an outside wall (11b) and opposing ends between the walls;

(b) an inside annular rim (11f) between the ends and around the inside wall of the tube with two spaced apart parallel shoulders (11g and 11h) which are perpendicular to the axis of the tube and with an annular face (11f) between the shoulders which is parallel to the axis of the tube;

(c) attachment means (12) at one end of the tube for securing the coupling to the form using connection means; and (d) a series of equally spaced apart concentric rings (11c) on the outside wall of the tube, wherein the rings are at predetermined heights relative to the attachment means.

SPECIFIC DESCRIPTION

Referring to FIGS. 1 and 2, the improved pipe coupling 10 of the present invention is shown. The coupling 10 is preferably an integral unit made of injection molded plastic (PVC) and includes a cylindrically shaped tube 11 having a cylindrical inside wall 11a defining a longitudinal axis A—A and a parallel cylindrical outside wall 11b and with a flange 12 at one end of the tube 11. The outside wall 11b has a series of parallel concentric rings 11c positioned such that the lower surface 11d is exactly an even number of inches (or centimeters) from the lower surface 12a of flange 12 and the dimension is preferably marked on the outside wall 11b of the tube 11 as shown in FIG. 1 for reasons which will become apparent. The rings 11c have lower surfaces 11d and upper surfaces 11e which are perpendicular to the longitudinal axis A—A of the tube 11.

The flange 12 includes holes 13 for nails or screws 102 which hold the coupling 10 in position on a pouring form 100 (shown in dotted lines in FIGS. 2 and 3). The lower surface 12a of the flange 12 is secured to the pouring form 100 using the nails or screws 102 as shown in FIG. 3 or by gluing (not shown). Adjacent to the upper surface 12a of flange 12 is a step form 14, concentric with and spaced from the lower most pour ring 11c, which has a radius which is the size of a standard size hole cutter so that the step form 14 fits in closely spaced relationship to a hole 104 in template 105 (as shown in dotted lines). The template 105 is used to position multiple couplings 10 so that piping (not shown) can be prefabricated for installation between couplings on the same level.

The inside wall 11a of the tube 11 includes an inner concentric annular rim 11f which is adapted to receive plastic pipes or the like which abut on spaced apart upper and lower shoulder surfaces 11g and 11h respectively, both of which are perpendicular to the longitudinal axis A—A of the tube 11.

The face 11i of the inner annular rim 11f is parallel to the longitudinal axis A—A and preferably projects towards the axis to produce a height (length of shoulders 11g and 11h) which is about equal to the wall thickness of a standard pipe 102 or 103 (as shown in dotted lines in FIG. 2). The inner wall 11a of tube 11 includes a chamfered portion 11j adjacent to the flange 12.

With the coupling 10 at a selected height, a cover 15 (FIG. 2) is placed over the outside surface 11b of the wall 11 at the end of tube 11 opposite the flange 12. This prevents cement from entering the inside of the coupling 10 during pouring and allows a cement finisher to pass over the coupling 10 at upper surface 101a or 101b of the concrete 101.

In use, a removable wooden form 100 is positioned for pouring of a concrete floor 101. The coupling 10 with the cap 15 is mounted on the form 100 and secured by nails 102 (FIG. 3), gluing or the like such that the surface 12a of flange 12 is against the form 100. The position of the coupling 10 can be set by template 105. The cement 101 is poured and allowed to set. The cap 15 which is usually a bright color for easy detection is then removed after the cement is set. The pipe 102 and 103 can then be mounted against the annular rim 11f at either end of the coupling 10 and inner wall 11a in a press fit and solvent welded. The chamfer 11j adjacent the flange 12 aids in starting the pipe in the tube 11 opening 16.

The coupling 10 of the present invention provides ease of installation during pouring of the cement 101. The concentric pour rings 11c and provide a good water seal between the coupling 10 and the cement 101. The rings 11c also provide a heat sink affect because of the concrete 101 which retards melting of the coupling 10 during a fire. Because of the height markings on the coupling 10, it is a simple matter for a wholesaler or other distributor to cut the couplings adjacent the underside 11d of a ring 11c to provide a coupling height corresponding to the concrete 101 pour height. The coupling 10 greatly reduces the cost and difficulty of providing plastic piping 102 or 103 between floors in a building. Further the coupling 10 can be used for other purposes such as mounting metal pipe as shown in FIG. 3 and toilet flange mounting as shown in U.S. Pat. No. 4,261,598.

FIG. 3 shows the coupling 10 mounted on a permanently placed pouring form 106 with opening 104 with a metal pipe 200 installed using elastic (rubber) retainers 300 at opposite ends of the coupling 10. The retainer 300 includes a top 301 which serves to aid in driving the retainer 300 in place with a hammer. Outer lip 303 aids in sealing to the inner wall 11a of tube 11 and inner lips 304 seal to the outer wall 200a of pipe 200. The retainer 300 is preferably split (not shown) in a plane parallel to the longitudinal axis A—A in order to provide a means of placing the retainer 300 over the installed pipe 200. Once installed the compression of the retainer 300 by the pipe 200 and wall 11a compresses the slit to provide a tight fluid seal.

As can be seen from FIG. 3 the retainer 300 with coupling 10 provides an easy and permanent means for holding pipe 200 in place. The retainer 300 can be sold with the couplings 10 as a kit for installation of metal pipe 200. The space 16 between the pipe 200 and inside wall 11a can be with packed with a ceramic fiber filter 305 or the like to provide fire retardancy. The filler 305 can be packed into coupling 10 from the flange 12 end as shown in FIG. 3 or from the opposite end above the coupling 10 with the retainer 300 in place at the flange 12 end. Generally it is easier to insert the filler 305 from above rather than below as shown in FIG. 3.

The preferred form of coupling 10 of the present invention is shown in FIGS. 1 to 3. Numerous variations will occur to those skilled in the art and are intended to be included within the scope of the present invention.

I claim:

1. A plastic coupling having spaced apart parallel cylindrical inside and outside walls which coupling is adapted to be embedded in a concrete floor and to be bonded to plastic pipe and to be at least temporarily supported by a form for pouring the concrete floor which comprises:
   (a) a tube having an inside cylindrical wall adapted to be bonded to the plastic pipe defining a cylindrical longitudinal axis, a cylindrical outside wall and opposing ends between the walls;
   (b) attachment means at one end of the tube for securing the coupling to the form using connection means;
   (c) a series of equally spaced apart concentric rings on the outside wall of the tube each with two spaced parallel sides perpendicular to the axis and an annular side parallel to the axis, wherein the series of rings are located between the ends of the tube, wherein the rings are at predetermined heights relative to the attachment means so that the coupling can be severed at any predetermined height adjacent one ring and then the tube fitted with a cap which fits on an opposing end of the tube when severed at the predetermined height for pouring the concrete floor to the height of the cap; and
   (d) a step on the outside wall of the tube adjacent to the attachment means which can be used with a positioning template to be layed on the form prior to pouring the concrete for positioning the coupling.

2. The coupling of claim 1 wherein an inside annular rim is provided between the ends and around the inside wall of the tube with two spaced apart parallel shoulders which are perpendicular to the axis of the tube and with an annular face between the shoulders which is parallel to the axis of the tube.

3. The coupling of claim 2 wherein the shoulders have a height towards the axis which is approximately the same as the spaced apart walls of pipe with which the coupling is to be used.

4. The coupling of claim 2 wherein the inside annular rim is located nearer to the end of the tube with the attachment means than to the opposite end of the tube.

5. The coupling of claim 1 wherein the attachment means is a circular flange having openings adapted to receive nails or screws.

6. The coupling of claim 1 wherein the height of the coupling relative to the attachment means end of the tube is marked on the outside wall of the tube.

7. The coupling of claim 1 wherein the step has a radius from the axis which is a standard size for cutting of an opening in the positioning template using a cutting tool.

8. The coupling of claim: 1 wherein a removable cap is provided which fits over the outside wall of the tube at the end opposite the attachment means.

9. The coupling of claim 1 wherein the attachment means is a circular flange having opposing surfaces, which are perpendicular to the axis of the tube.

10. The coupling of claim 1 as a kit with two elastic rubber retainers adapted to support in the coupling at the opposing ends a smaller radius pipe than the inside wall of the tube and to provide a fluid tight seal at either end of the coupling and with a fire retardant ceramic filler material to be provided inside the coupling between the retainers.

11. The coupling of claim 1 wherein the tube at the end opposite the attachment means projects above a ring wherein the coupling is severed adjacent one ring on the side closest to the attachment means and wherein the cap fits over the outside wall on the opposing end of the tube.

12. A method for coupling plastic pipe through a concrete floor which comprises:

(a) providing plastic coupling having spaced apart parallel cylindrical inside and outside walls which coupling is adapted to be embedded in a concrete floor for and to be bonded to plastic pipe and to be at least temporarily supported by a form for pouring the concrete floor including (1) a tube having an inside cylindrical wall adapted to be bonded to the plastic pipe defining a cylindrical longitudinal axis, a cylindrical outside wall and opposing ends between the walls;

(2) attachment means at one end of the tube for securing the coupling to the form using connection means;

(3) a series of equally spaced apart concentric rings on the outside wall of the tube each with two spaced parallel sides perpendicular to the axis and an angular side parallel to the axis, wherein the series of rings are located between the ends of the tube, wherein the rings are at predetermined heights relative to the attachment means, so that the coupling can be severed at any predetermined height adjacent one ring and then the tube fitted with a cap which fits on an opposing end of the tube when severed at the predetermined height for pouring the concrete floor to the height of the cap; and (4) a step on the outside wall of the tube adjacent to the attachment means which can be used for use with a positioning template sheet to be layed on the floor prior to pouring the concrete for positioning the coupling;

(b) severing the coupling adjacent the ring at the predetermined height;

(c) fitting the cap on the coupling at the predetermined height;

(d) mounting the coupling with the cap on the form using the template sheet; and (e) pouring the concrete floor to the predetermined height.

13. The method of claim 12 wherein the severing provides a cut which is perpendicular to the axis of the tube.

14. The method of claim 12 wherein:
(a) a pipe is provided through the tube, the pipe having a smaller radius than the tube;
(b) a fire retardant ceramic material is packed inside the coupling; and (c) two rubber retainers adapted to support the pipe in the coupling at the opposed ends are fitted to the pipe and tube to provide a fluid tight seal at either end of the coupling.

* * * * *